US007484390B1

(12) United States Patent
Finkelstein et al.

(10) Patent No.: US 7,484,390 B1
(45) Date of Patent: Feb. 3, 2009

(54) LOCKABLE STRIKE FOR WALK-IN COLD ROOMS

(75) Inventors: Burl M. Finkelstein, Newnan, GA (US); Brett A. Mitchell, Newnan, GA (US); Raymond J. Hiller, Newnan, GA (US)

(73) Assignee: Kason Industries, Inc., Shenandoah, GA (US)

( * ) Notice: Subject to any disclaimer, the term of this patent is extended or adjusted under 35 U.S.C. 154(b) by 0 days.

(21) Appl. No.: 11/692,543

(22) Filed: Mar. 28, 2007

(51) Int. Cl.
*B60R 25/02* (2006.01)

(52) U.S. Cl. ............................... 70/212; 70/129; 70/92; 292/92

(58) Field of Classification Search ................... 70/211, 70/212, 92, 129; 292/92
See application file for complete search history.

(56) References Cited

U.S. PATENT DOCUMENTS 1,260,469 A * 3/1918 Smith ......................... 292/153
1,916,848 A 7/1933 North ............... 292/DIG. 71 X
2,001,740 A 5/1935 McPherson ....... 292/DIG. 59 X
2,074,979 A 3/1937 Brantingson ................ 292/340
2,153,819 A 4/1939 Van Voorhees .... 292/DIG. 59 X
2,193,488 A 3/1940 Morley et al. ................. 200/55
2,198,079 A * 4/1940 Ferris et al. ................. 292/143
2,265,961 A 12/1941 Hogg ............... 292/DIG. 59 X
2,872,233 A 2/1959 Bordner, Jr. .................. 292/92
3,465,557 A 9/1969 Ryder ......................... 70/139
3,599,453 A 8/1971 Bauernfeind ................. 70/129
3,652,113 A 3/1972 Odend'hal et al. ................ 292/DIG. 71 X
3,678,716 A 7/1972 Cobb ............................ 70/92
3,744,283 A 7/1973 Schmidt ................... 70/141 X
3,843,173 A * 10/1974 Harrell .......................... 292/7
4,099,754 A 7/1978 Hoebing ........... 292/DIG. 65 X
4,203,622 A 5/1980 Cook et al. ....... 292/DIG. 71 X
4,229,956 A 10/1980 Thorburn ..................... 70/129
4,280,725 A 7/1981 Berkowitz et al. .......... 292/223

(Continued)

FOREIGN PATENT DOCUMENTS

DE 1915618 10/1970 .................. 70/360

(Continued)

OTHER PUBLICATIONS

Kason Catalog 6, p. 106, Kason 4001 locking handle.

(Continued)

*Primary Examiner*—Suzanne D Barrett
(74) *Attorney, Agent, or Firm*—Baker Donelson et al.

(57) ABSTRACT

A lockable strike for walk-in cold rooms includes a housing that includes a recessed well with openings positioned on opposing sides thereof to accept a locking device therethrough and a deadbolt moveably engaged therein to reciprocally move along a path of travel between an extended position and a retracted position with respect to the housing; and a knob rotatably mounted within the recessed well and having an opening through a handle thereof positioned relative to the openings in the housing to further accept the locking device therethrough thereby preventing the rotation of the knob in a first position, wherein the handle can engage the locking device when it is inserted through the openings in the housing thereby preventing the rotation of the knob in a second position, and the knob is in communication with the deadbolt to move the deadbolt between the extended position and the retracted position when the knob is rotated.

8 Claims, 5 Drawing Sheets

U.S. PATENT DOCUMENTS

| | | | | |
|---|---|---|---|---|
| 4,341,408 | A | 7/1982 | Blevins | 292/150 |
| 4,475,364 | A | 10/1984 | Frank | 70/139 |
| 4,484,462 | A | 11/1984 | Berkowitz | 70/224 X |
| 4,553,415 | A | 11/1985 | Maffey | 70/360 X |
| 4,565,079 | A | 1/1986 | Smith | 70/134 |
| 4,565,080 | A | 1/1986 | Kincaid et al. | 70/224 X |
| 4,613,176 | A | 9/1986 | Kelly | 292/201 |
| 4,635,977 | A | 1/1987 | Yamada | 292/DIG. 71 X |
| 4,669,282 | A | 6/1987 | Hoyt et al. | 70/129 |
| 4,697,444 | A | 10/1987 | Maffey | 70/361 X |
| 4,704,882 | A | 11/1987 | Takasaki | 70/215 |
| 4,782,675 | A | 11/1988 | Thorburn | 70/129 |
| 4,884,421 | A | 12/1989 | Lindsay | 70/129 |
| 4,911,486 | A * | 3/1990 | Anderson | 292/148 |
| 4,991,414 | A | 2/1991 | Moore et al. | 70/360 X |
| 5,000,494 | A * | 3/1991 | Guibleo | 292/148 |
| 5,152,564 | A | 10/1992 | Martineau | 292/288 |
| 5,456,505 | A | 10/1995 | Yamada | 292/DIG. 71 X |
| 5,490,697 | A | 2/1996 | Surko, Jr. | 292/DIG. 71 X |
| 5,582,443 | A | 12/1996 | Finkelstein et al. | 292/DIG. 71 X |
| 5,634,357 | A | 6/1997 | Nutter et al. | 70/210 |
| 6,112,471 | A | 9/2000 | Welch et al. | 49/503 |
| 6,178,789 | B1 | 1/2001 | Finkelstein et al. | |
| 6,354,119 | B1 | 3/2002 | Molzer | 292/DIG. 59 X |
| 6,526,788 | B2 | 3/2003 | Finkelstein et al. | 70/129 |
| 6,877,346 | B1 | 4/2005 | Finkelstein | |
| 6,923,029 | B2 * | 8/2005 | Waschgler | 70/210 |
| 6,952,940 | B2 * | 10/2005 | Molzer et al. | 70/210 |
| 2007/0119220 | A1 * | 5/2007 | Maquet | 70/212 |

FOREIGN PATENT DOCUMENTS

| | | | |
|---|---|---|---|
| FR | 1528245 | 4/1968 | 70/224 |
| GB | 2040344 | 8/1980 | 70/215 |
| GB | 2172331 | 9/1986 | 70/371 |
| GB | 2219035 | 11/1989 | 292/DIG. 62 |
| GB | 2263304 | 7/1993 | 70/224 |
| WO | WO 90/06412 | 6/1990 | 70/224 |

OTHER PUBLICATIONS

Kason Catalog 6, p. 110, Kason 4168 locking handle.
Illinois Locks Catalog, p. 19, Illinois Lock D6714 locking cylinder.
Illinois Locks Catalog, p. 19, Illinois Lock D8714 locking cylinder.
Chicago Lock Co. Catalog, 3-7, Chicago 180-4255 Handle cylinder.

* cited by examiner

LOCKABLE STRIKE FOR WALK-IN COLD ROOMS

TECHNICAL FIELD

This invention relates to walk-in cold rooms, and specifically to a lockable strike for walk-in cold rooms.

BACKGROUND OF INVENTION

Walk-in cold rooms, such as walk-in coolers, freezers, or other refrigerated environments, are common in various industries, including supermarkets and grocery stores, commercial kitchens, and other food service facilities. They typically have one or more access doors for entry and exit from the environment. Since these environments are often used to store valuable contents, such as expensive products and/or large quantities of products, it is typically desirable that the access door(s) can be locked to control and/or restrict access to such contents. For example, to control access, the availability of a keyed locking option may be desirable so that keys can be provided to personnel who are authorized to access the cold-room environment. As another example, to restrict access during certain times, the availability of an alternate or additional locking option may be desirable so that even authorized personnel cannot access the cold-room environment. There may also be other reasons to control and/or restrict access to walk-in cold rooms such as safety or maintenance.

Accordingly, it is seen that a need exists for a lockable strike for walk-in cold rooms that allows a user to control and/or restrict access to it, for example, as described above. It is to the provision of such therefore that exemplary embodiments of the present invention are primarily directed.

SUMMARY OF INVENTION

The invention, in accordance with exemplary embodiments described herein, provides a lockable strike for walk-in cold rooms. A general exemplary embodiment of the invention can include a housing that includes a recessed well with openings positioned on opposing sides of the housing to accept a locking device through them and a deadbolt moveably engaged within the housing to reciprocally move along a path of travel between an extended position and a retracted position with respect to the housing. The exemplary embodiment further include a knob rotatably mounted within the recessed well that has an opening through a handle of the knob positioned relative to the openings in the housing to further accept the locking device through it thereby preventing the rotation of the knob when it is in a first position. The handle can engage the locking device when it is inserted through the openings in the housing thereby preventing the rotation of the knob when it is in a second position, and the knob is in communication with the deadbolt to move the deadbolt between the extended position and the retracted position when the knob is rotated.

DETAILED DESCRIPTION

Figure 1:
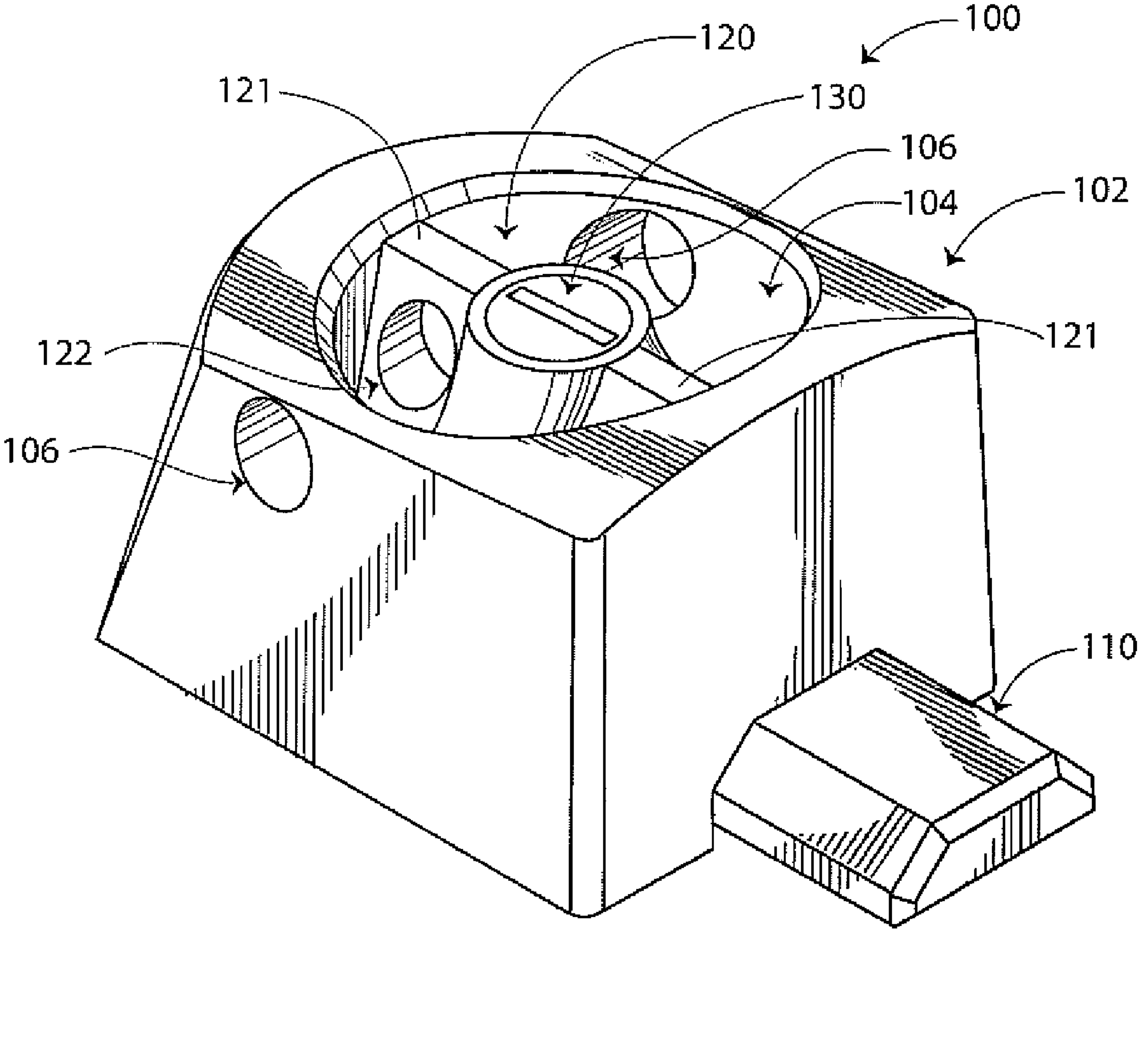
FIG. 1 is a perspective view of a lockable strike for walk-in cold rooms.

With reference to the drawings, FIG. 1 is a perspective view of a lockable strike 100 for walk-in cold rooms. The lockable strike 100 may, for example, be used in conjunction with a handle attached to a door of a walk-in cold room to control and/or restrict opening of the door to access the walk-in cold room. The lockable strike 100 includes a housing or body 102 having a recessed portion or well 104 and one or more holes or opening 106 that extends through a portion of the housing that defines the well 104.

The lockable strike 100 also includes a knob 120 that is at least partially positioned within the well 104. The knob 120 includes one or more gripping portions 121 that facilitate rotational operation of the knob 120. Knob gripping portions 121 include one or more holes 122 therethrough which are alignable with housing holes, the holes are all aligned along a lock path. It is noted that, among other benefits, the positioning of the knob 120 within the well 104 can provide an effective seal that prevents dirt, debris, and/or other undesirable materials from entering the housing 104 and, for example, contaminating the walk-in cold room, or allowing an undesirable loss of cooling from the cold room.

A cylinder lock 130 is positioned within a central portion of the knob 120. The cylinder lock 130 provides another manner of locking the lockable strike 100. The lockable strike 100 includes a reciprocating tongue or deadbolt 110, which can be extended and retracted within the housing 102 by operation of the knob 120 and also locked in one or more of these positions. As will be apparent, the deadbolt 110 can facilitate the locking or unlocking capability of the lockable strike 100.

Figure 2A:
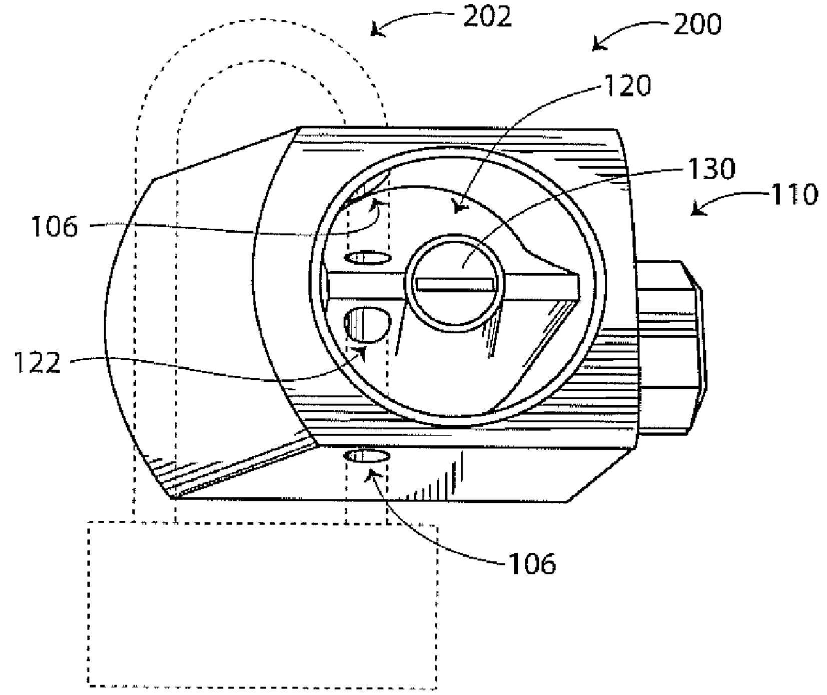
FIGS. 2A and 2B are front perspective views showing a locking capability of the lockable strike for walk-in cold rooms shown in FIG. 1 in a locked and unlocked configuration respectively.
Figure 2B:
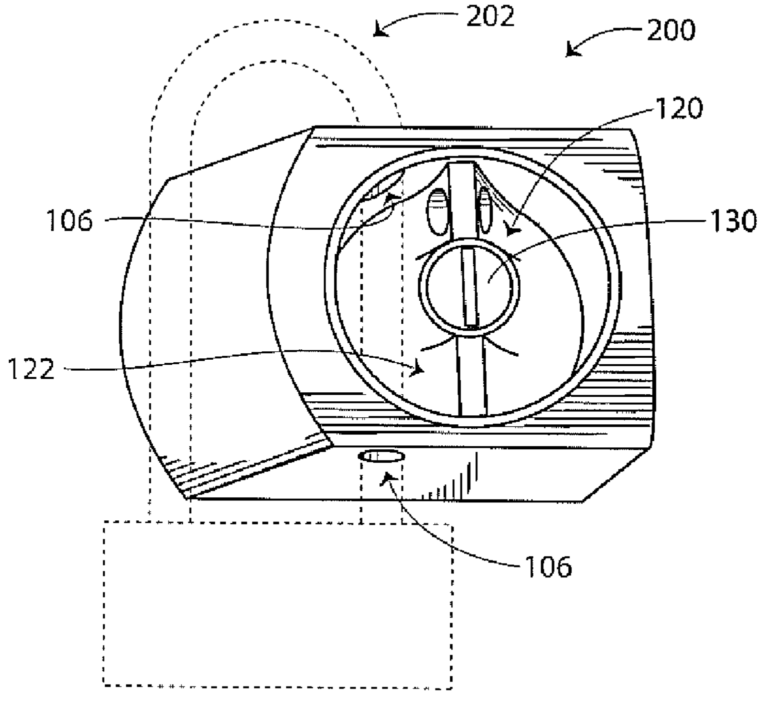

FIGS. 2A and 2B are front perspective views 200 showing a locking capability of the lockable strike 100 for walk-in cold rooms shown in FIG. 1 in a locked and unlocked configuration respectively. A locking device 202, such as a padlock is shown with a shackle that extends through the housing holes 106 and also through the knob hole 122, along the lock path, thereby locking the knob 120 in a locked position where the deadbolt 110 is also extended in a locked position. Thus, the locking device 202 can be used to lock the lockable strike 100 while it is in a locked configuration with the deadbolt 110 extended.

Moreover, as depicted in FIG. 2B, the locking device 202 can alternately be extended through the holes 106 of the housing 102 while the knob 120 is positioned such that the lockable strike 100 is in an unlocked configuration with the deadbolt 110, where the deadbolt 110 is retracted. As shown, in such locked configuration, the radially extending portions 121 of the knob 120 are restricted from moving past the locking device 202 thereby restricting the operation of the knob 120 and thus the lockable strike 100. It should be understood that other devices that, for example, can be extended through the holes 122, 106, can be utilized for the locking device 202 to lock the lockable strike 100 in the locked or unlocked configurations. Thus, the holes 106, 122 can facilitate at least one way of locking the lockable strike 100 in a locked or unlocked configuration.

Figure 3A:
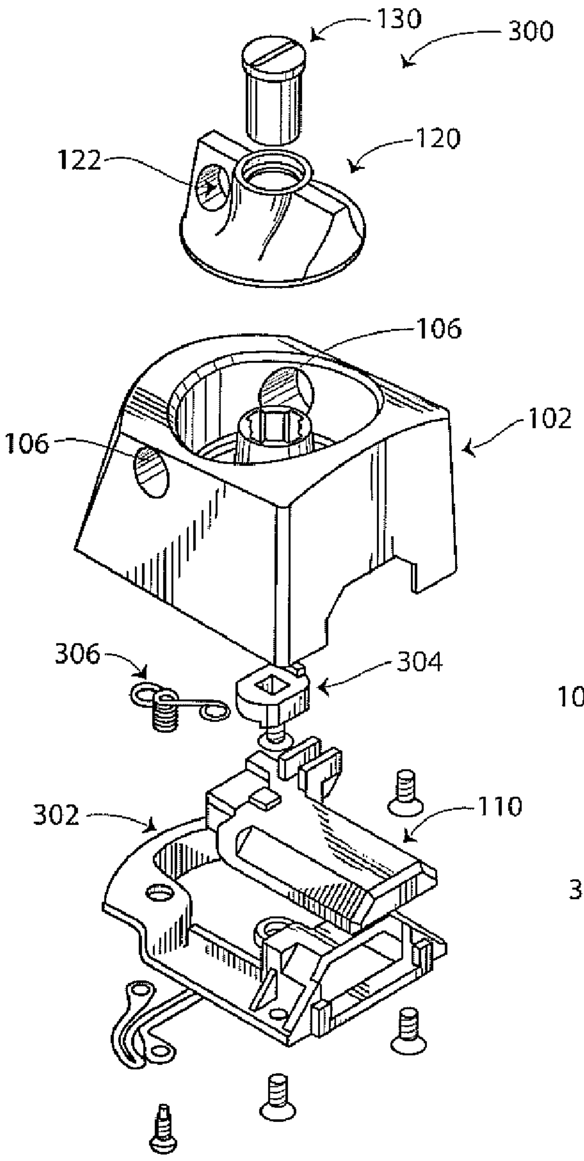
FIGS. 3A and 3B are exploded perspective views of the lockable strike for walk-in cold rooms shown in FIG. 1.
Figure 3B:
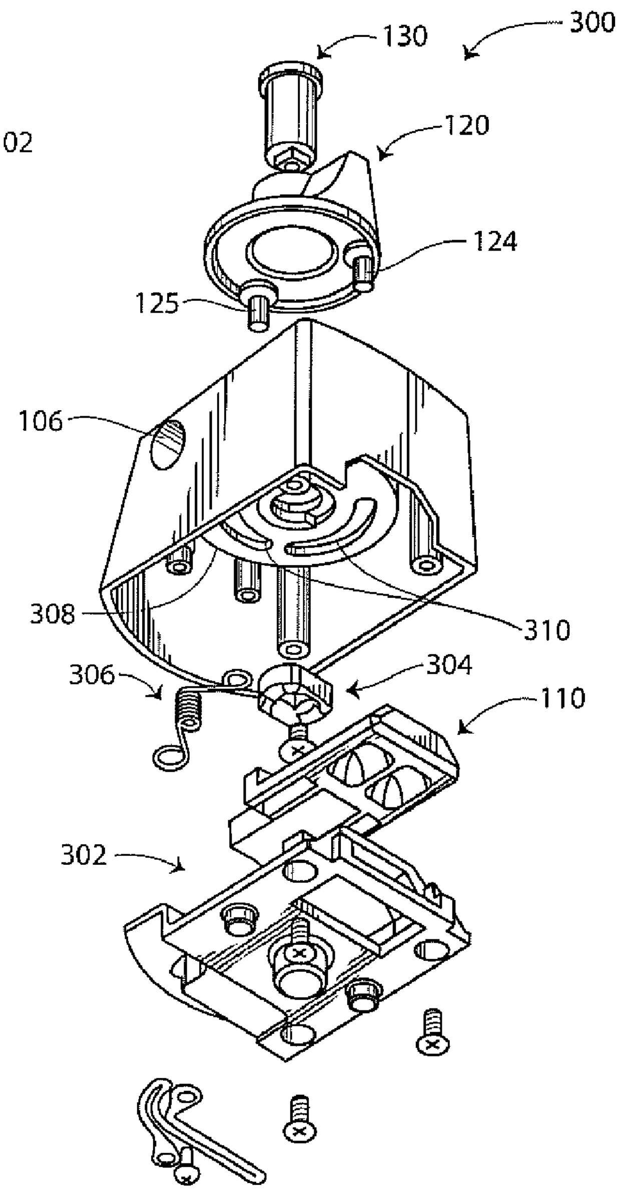

FIGS. 3A and 3B are exploded perspective views 300 of the lockable strike 100 for walk-in cold rooms shown in FIG. 1. The lockable strike 100 also includes a bottom plate 302, which further house and/or support various components of or related to the lockable strike 100, and a cylinder stop 304 which in conjunction with the cylinder lock 130 enables the strike to be in a locked and/or unlocked configuration. Furthermore, a spring 306 is depicted that can facilitate the operation of the lockable strike 100 between a locked and unlocked configuration. The spring 306 can be connected between one or more portions of the knob 120, the cylinder lock 130, and/or the housing in a manner (e.g., under tension or compression) such that it assist in the movement of the knob 120, cylinder lock 130, and/or other components of the lockable strike 100, between a locked and unlocked configuration.

Also depicted in FIG. 3B are knob pins 124, 125, which can facilitate the operation of the deadbolt 110 between a locked and unlocked configuration. A knob guide 308 is also included in FIG. 3B, which includes arcuate slots 310 therethrough with which the knob pins 124, 125 can moveably engage to translate rotational operation of the knob 120 to the deadbolt 110.

Figure 4A:
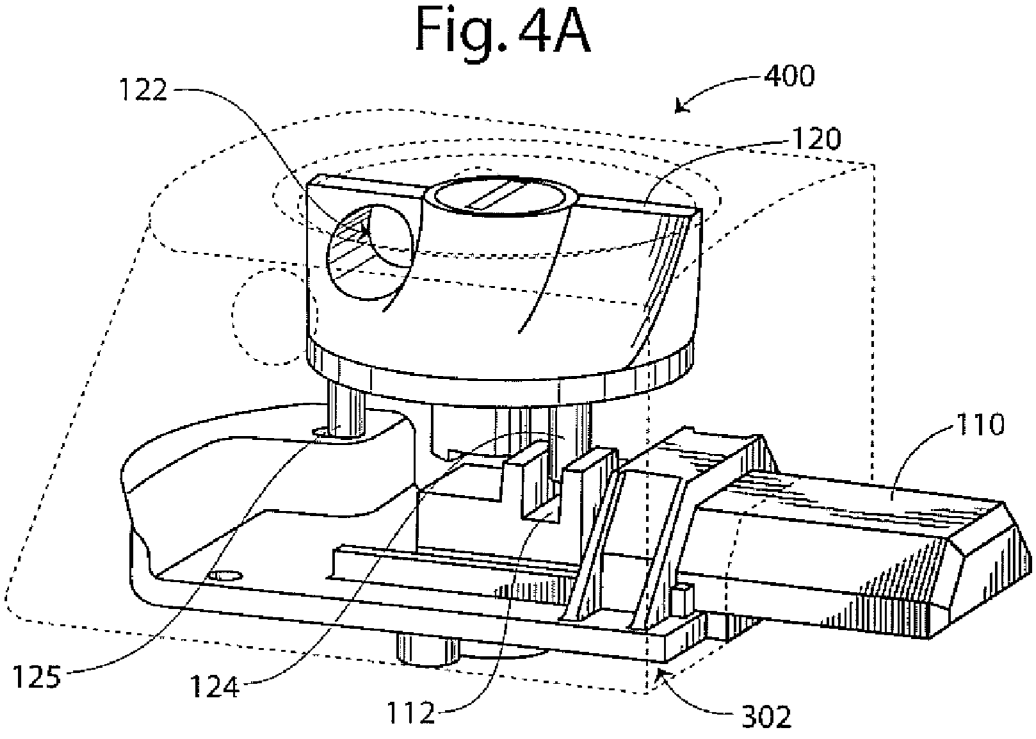
FIGS. 4A and 4B are internal views of the lockable strike for walk-in cold rooms shown in FIG. 1 in a locked and unlocked configuration respectively including a knob mechanism.
Figure 4B:
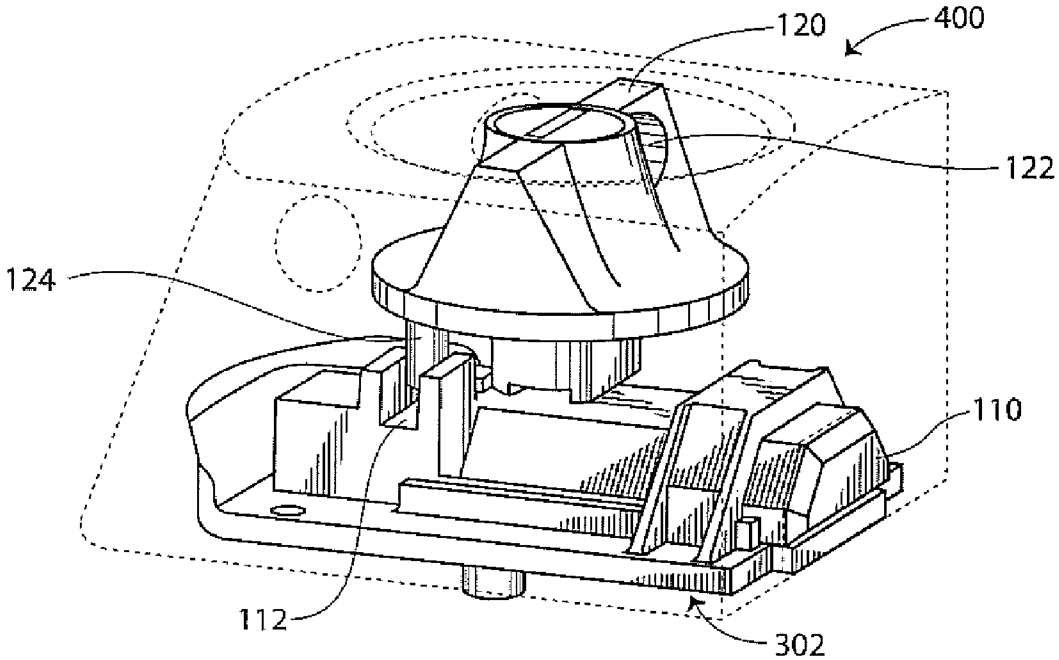

FIGS. 4A and 4B are internal views 400 of the lockable strike 100 for walk-in cold rooms shown in FIG. 1 in a locked and unlocked configuration respectively including the knob 120 and related components. An actuating groove or channel 112 is shown in mating engagement with the knob pin 124 so that the deadbolt 110 is extended to a locked configuration or retracted to an unlocked configuration when the knob 120 is operated. For example, with respect to FIG. 4A, if the knob 120 is rotated clockwise (e.g., approximately 90 degrees), then the deadbolt 110 is retracted to the position depicted in FIG. 4B and vice versa. It is thus by this interaction of the knob 120 and the deadbolt 110 (i.e., via the knob pin 124 and actuating groove 112) that restricting the operation of the knob 120 (e.g., via a padlock or other locking device 202) can in turn restrict the movement of the deadbolt 110 between a locked or unlocked configuration.

Figure 5A:
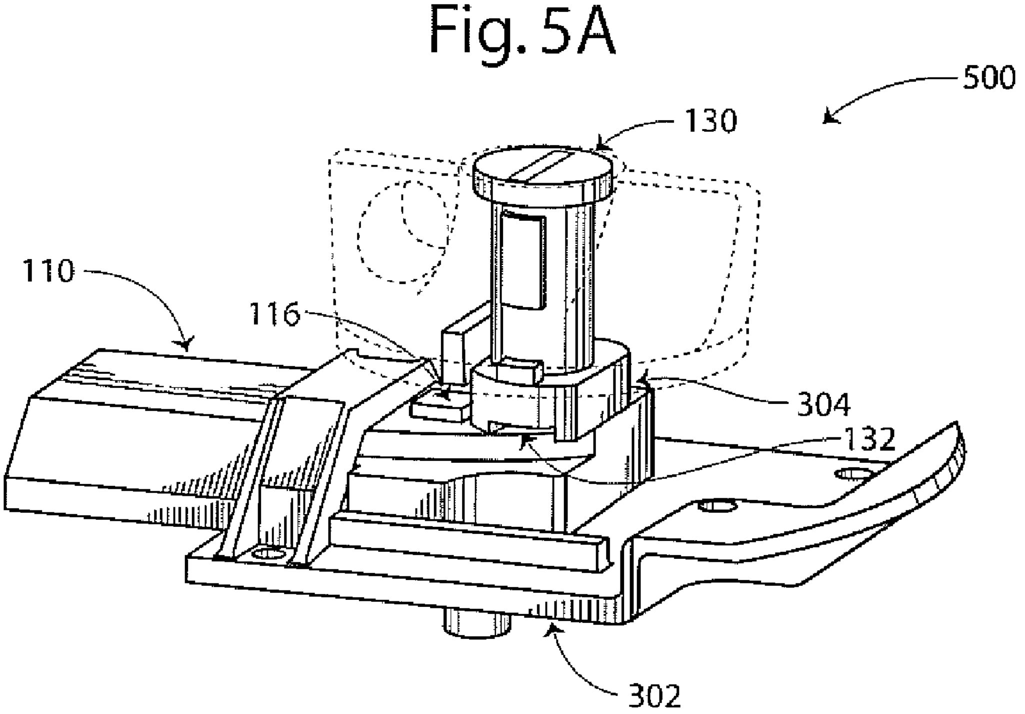
FIGS. 5A and 5B are alternate internal views of the lockable strike for walk-in cold rooms shown in FIG. 1 in a locked and unlocked configuration respectively including a cylinder mechanism.
Figure 5B:
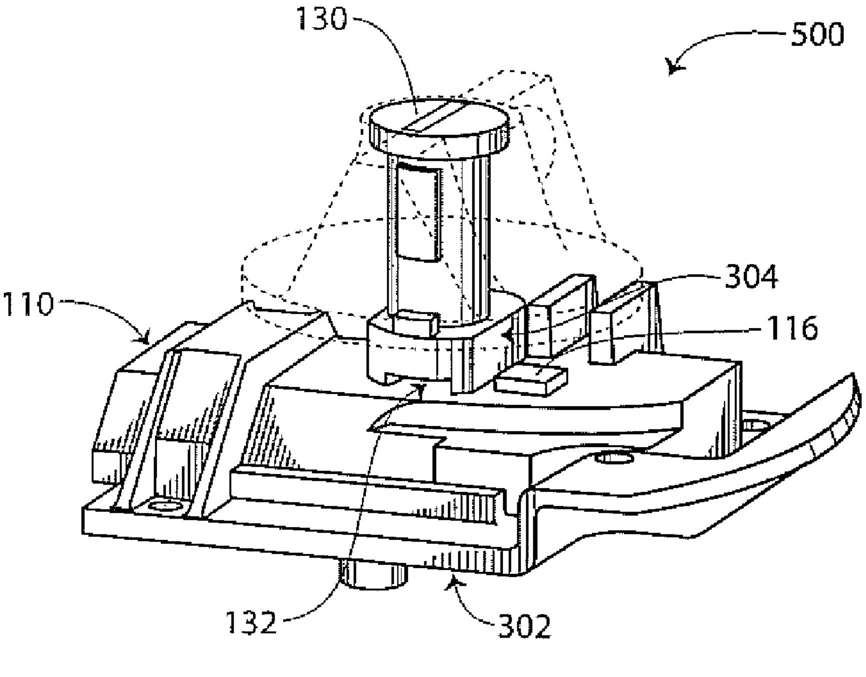

FIGS. 5A and 5B are additional internal views 500 of the lockable strike 100 for walk-in cold rooms shown in FIG. 1 in a locked and unlocked configuration respectively. In addition to the previously described components, the strike 100 further includes a deadbolt stop 116 which extends from the top surface of the deadbolt 110 and a rotatable cylinder stop 304 coupled to the cylinder lock 130 and having a stop tunnel 132 therein. The cylinder stop 304 is configured to allow the deadbolt stop 116 to pass thereunder when the cylinder lock 130 is positioned appropriately. As also depicted in FIGS. 5A and 5B, the cylinder stop 304 can restrict the movement of the deadbolt 110 via the deadbolt stop 116 engaging the cylinder stop 304 (e.g., when the cylinder lock 130 is in a locked position) and thereby restrict the deadbolt 110 to an extended (e.g., locked) or retracted (e.g., unlocked) configuration. However, when the cylinder lock 130 is actuated accordingly such that the stop tunnel 132 is aligned with the deadbolt stop 116 (e.g., when the cylinder lock 130 is in an unlocked position), the deadbolt 110 can be moved via the knob 120 between an extended and retracted configuration. It is thus by this interaction of the cylinder lock 130 and the deadbolt 110 (i.e., via the cylinder stop 304 and deadbolt stop 116) that operation of the cylinder lock (e.g., between a locked and unlocked position, e.g., using a key) can in turn restrict the movement of the deadbolt 110 in, for example, a locked or unlocked configuration as discussed above.

Therefore, in light of the foregoing, it can be seen that exemplary embodiments of the lockable strike described herein can allow a user to control and/or restrict access to walk-in cold rooms. For example, a user can control access to a cold room environment using the lockable strike 100 by providing one or more keys to the cylinder lock 130 to personnel who are authorized to access the cold room, thus limiting access to these authorized personnel. Yet, as another example, a user can restrict access to the cold room using the lockable strike 100 by installing a locking device 202 through the housing holes 106 and the knob hole 122 thereby restricting movement of the knob 120 while the deadbolt 110 is in a locked configuration so that even authorized personnel with a key to the cylinder lock 130 cannot access the cold-room environment. Additionally, as discussed above, a user can control or restrict the lockable strike 100 to an unlocked configuration by the foregoing methods via the cylinder lock 130 and/or the knob 120 and a locking device 202.

It should also be understood and/or otherwise apparent that such elements of exemplary embodiments of the invention may be constructed in numerous forms, shapes, sizes, etc. of numerous materials, compositions, formations, etc., using numerous methods, processes, procedures, etc. For example, exemplary embodiments of the invention may include elements that are constructed of plastic or other non-metallic materials, which may, for example, also offer the benefit of reduced thermal conduction (e.g., between the cold room and the adjacent environment) and lower the costs to manufacture.

It should be understood that the foregoing descriptions merely relate to exemplary, illustrative embodiments of the invention. Therefore, it should also be understood that various modifications may be made to exemplary embodiments described herein that are within the scope of the invention, which will be recognized by one of ordinary skill in the art in light of the disclosure herein. Furthermore, various elements of the described exemplary embodiments of the invention may be known in the art or recognized by one of ordinary skill in the art based on the disclosure herein.

The invention claimed is:

1. A lockable strike for walk-in cold rooms, comprising a housing having a lock wall with a first lock opening and a second lock opening aligned with said first lock opening along a lock path;

a locking mechanism which includes a reciprocally moving deadbolt and a rotatable gripping handle, said handle being coupled to said deadbolt so that rotatable movement of said gripping handle causes the reciprocating movement of said deadbolt, said gripping handle also including a third lock opening therethrough, said gripping handle being moveable between a first position with said gripping handle third lock opening aligned along said lock path and a second position with said gripping handle third lock opening not aligned along said lock path, said gripping handle also being configured so that a portion of said gripping handle passes through said lock path upon rotational movement of said gripping handle from said first position to said second position and a cylinder lock rotatably mounted to said gripping handle, said cylinder lock being actuatable between a locked position preventing rotational movement of said gripping handle and an unlocked position allowing rotational movement of said gripping handle, whereby a locking device may be positioned along said lock path to lock the gripping handle in its first position, and whereby a locking device may be positioned along said lock path to lock the gripping handle in its second position by preventing rotational movement of said gripping handle from said second position to said first position.

2. A lockable strike for walk-in cold rooms, comprising a housing having a lock wall with a first lock opening and a second lock opening aligned with said first lock opening, along a lock path;

a locking mechanism which includes a reciprocally moving deadbolt and a rotatable gripping handle, said handle being coupled to said deadbolt so that rotatable movement of said gripping handle causes the reciprocating movement of said deadbolt, said gripping handle also including a third lock opening therethrough, said gripping handle being moveable between a first position with said gripping handle third lock opening aligned along said lock path and a second position with said gripping handle third lock opening not aligned along said lock path, said gripping handle also being configured so that a portion of said gripping handle passes through said lock path upon rotational movement of said gripping handle from said first position to said second position, a removable locking device configured to be received within said housing first and second locking openings and said gripping handle third opening, and a cylinder lock rotatably mounted to said gripping handle, said cylinder lock being actuatable between a locked position preventing rotational movement of said gripping handle and an unlocked position allowing rotational movement of said gripping handle, whereby a locking device may be positioned along said lock path to lock the gripping handle in its first position, and whereby a locking device may be positioned along said lock path to lock the gripping handle in its second position by preventing rotational movement of said gripping handle from said second position to said first position.

3. The lockable strike of claim 1 wherein said housing wall defines a circular recess and wherein said gripping handle is positioned within said circular recess.

4. A lockable strike for walk-in cold rooms, comprising:

a housing including a recessed well with openings positioned on opposing sides thereof to accept a locking device therethrough;

a deadbolt moveably engaged within said housing to reciprocally move along a path of travel between an extended position and a retracted position with respect to the housing;

a knob rotatably mounted within the recessed well and having an opening through a handle thereof positioned relative to said openings in the housing to further accept the locking device therethrough thereby preventing the rotation of the knob in a first position, wherein the handle can engage the locking device when the locking device is inserted through the openings in the housing thereby preventing the rotation of the knob in a second position, and the knob is in communication with the deadbolt to move the deadbolt between the extended position and the retracted position when the knob is rotated, and a cylinder lock rotatably mounted within a central portion of the knob and having a cylinder stop including a tunnel opening rotatably mounted within the path of travel of the deadbolt, wherein the deadbolt includes a deadbolt stop structured to engage the cylinder stop and to pass through the tunnel opening, whereby the cylinder lock can be locked to prevent movement of the deadbolt from the extended position or the retracted position.

5. The lockable strike of claim 4, wherein the cylinder lock can be locked when the knob is in the first position to thereby lock the deadbolt in the extended position, and the cylinder lock can be locked when the knob is in the second position to thereby lock the deadbolt in the retracted position.

6. The lockable strike of claim 4, wherein the housing comprises at least a top surface and a side surface, wherein the top surface includes a recessed portion defining the recessed well and having at least an inner surface, and wherein the openings in the housing comprise a first hole defined between the side surface and the inner surface, and a second hole defined between the side surface and the inner surface and at least partially aligned with the first hole.

7. The lockable strike of claim 4, wherein the knob includes at least one pin extending from a bottom portion thereof into an interior of the housing, and the deadbolt includes a channel that the pin is moveably engaged with to move the deadbolt between the extended position and the retracted position when the knob is moved from the first position to the second position.

8. The lockable strike of claim 7, wherein the locking device can be inserted through the openings in the housing and the opening through the handle when the knob is in the first position to thereby lock the deadbolt in the extended position, and the locking device can be inserted through the openings in the housing when the knob is in the second position to thereby lock the deadbolt in the retracted position.

* * * * *